Aug. 13, 1940.  R. R. SEARLES ET AL  2,211,295
BEARING DEVICE
Filed April 9, 1938
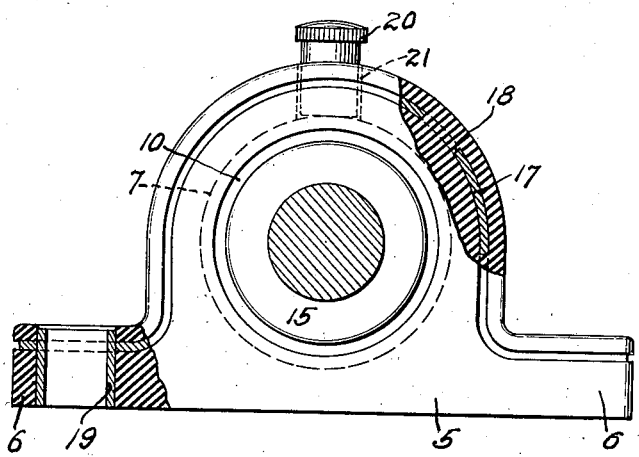
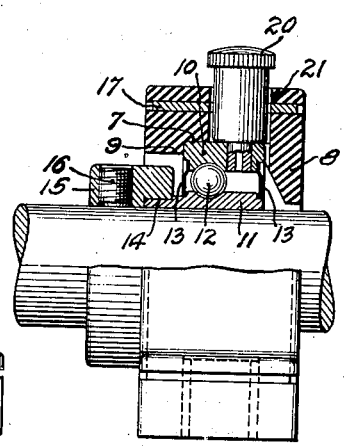
INVENTORS
RAYMOND R. SEARLES
JOHN W. SMITH
BY
ATTORNEYS Patented Aug. 13, 1940

2,211,295

UNITED STATES PATENT OFFICE 2,211,295

BEARING DEVICE

Raymond R. Searles and John W. Smith, New Britain, Conn., assignors to The Fafnir Bearing Company, New Britain, Conn., a corporation of Connecticut Application April 9, 1938, Serial No. 201,027

3 Claims. (Cl. 308—184)

Our invention relates to a pillow block. Heretofore pillow blocks have been constructed of sound deadening material, such as rubber and the like, and anti-friction bearings have been mounted therein. Such bearings and pillow blocks are now widely used for the fan, or other rotary parts of air conditioning and similar equipment and have served the purpose of largely eliminating bearing and other noises incident to the rotation of the fan and other members. Such pillow blocks, while being relatively cheap in construction and being efficient for the purpose for which they are designed, have in some instances been lacking in the rigidity desired for particular installations or uses.

It is an object of our invention to provide a pillow block of sound deadening material which is sufficiently rigid for all practical purposes and yet which possesses the necessary resiliency and sound deadening properties for use in air conditioning and other equipment.

It is a further object to provide a pillow block formed essentially of sound deadening material, such as rubber or the like, having improved means for reinforcing the same.

Other objects and various features of improvement will be hereinafter pointed out or will become apparent to those skilled in the art.

In the drawing which shows, for illustrative purposes only, a preferred form of the invention—

Fig. 1 is an axial view of a pillow block illustrating features of the invention, parts being broken away to show interior construction; and Fig. 2 is an edge view in quarter section of the pillow block shown in Fig. 1.

In said drawing 5 indicates a pillow block formed of a body of sound deadening material, such as rubber, synthetic rubber or the like. The block 5 is provided with integral foot portions 6—6, extending laterally therefrom and, in the form shown, the entire base of the main body of the pillow block and the foot portions are in a single plane, adapted to rest and be secured upon a suitable support, as will be understood. The main body of the block 5 is provided with a circular bearing receiving recess 7, and integral bearing retaining flanges or shoulders 8—9 are provided at opposite sides of and define the bearing receiving recess in a lateral direction. An anti-friction bearing, such as a ball bearing, is mounted in the bearing receiving recess. The bearing illustrated includes an outer bearing ring 10, which has been forced into and is quite securely held in the recess 7 by the resiliency of the rubber material. The inner ring 11 is provided with a raceway groove, complementary to a raceway groove in the outer ring 10, and the balls 12 serve to hold the two rings in unit handling relationship. Seal plates 13—13 at opposite sides of the bearing form an enclosed bearing, which will retard or prevent the leakage of grease from or the entry of foreign matter into the bearing. In the form illustrated the inner ring 11 has a long extension 14 at one edge, formed with an eccentric outer surface over which the counterbore of the locking collar 15 is eccentrically formed, so that upon a slight rotation between the inner ring 11 and the locking collar 15 the parts will jam and the inner ring will be very securely held on the shaft passing through the inner ring and locking collar. 16 indicates a set screw or the like, which serves to position the locking collar, although the eccentric locking surfaces themselves serve to lock the inner ring to the shaft.

The pillow block as thus far described has been found to be quite serviceable and effective in use but we have devised means for stiffening or strengthening the pillow block without substantially detracting from its sound deadening qualities. We provide a reinforcing means embedded in the pillow block and preferably in the foot portions, so as to stiffen the entire block without, however, seriously impairing the sound deadening qualities thereof. In the form shown the reinforcing member comprises a relatively thin flexible metal strap 17, of a width almost that of the body of the pillow block itself, as appears particularly in Fig. 2. The mid-portion of the strap 17 is of generally arcuate form and conforms substantially in shape to the circular bearing receiving recess 7. The strap 7 is removed a substantial distance from the bearing recess 7 and is preferably positioned quite near the outer edge of the block, as illustrated. In the preferred form the strap 17 is molded or cast directly in place and is therefore permanently united with the block. In order to secure a more permanent and homogeneous union between the strap 17 and the material of the pillow block, we prefer to provide the strap 17 with a plurality of openings, which may be in the form of drilled or other holes, as 18, at several places along the length of the strap. Thus, when the pillow block is molded with the reinforcing strap 17 in place the material of which the block 5 is made will be homogeneous at opposite sides of and through the openings 18. In other words, there will be keying lugs or dowels integral with the material of the pillow block at opposite sides of and passing through openings in the reinforcing strap 17. Thus, there is little or no likelihood of a loosening of the strap 17 in the pillow block, either from vibration or from deterioration of the sound deadening material or the strap itself.

The strap 17 at the ends is bent to extend into the foot portions 6—6 as shown and the foot portions are provided with apertures for receiving metal spacer sleeves, such as 19, which extend through apertures in the reinforcing strap 17 and preferably fit quite tightly therein. The sleeves 19 may be slightly shorter than the normal thickness of the foot portions 6—6, so that when securing bolts or other fastening means are passed through the apertures the head of the bolt or washer therebeneath will serve to compress the foot portions 6—6 to some extent until the top of the sleeve is engaged. These sleeves 19 prevent undue crushing of the foot portions 6—6 by the fastening means and this in turn assures the correct positioning of the main body.

Thus, when the pillow block is secured in place on a support the anti-friction bearing heretofore described will be somewhat resiliently supported and the sound deadening material of which the block 5 is formed will serve to dampen out or deaden bearing noises and other sounds incident to the rotation of the shaft which usually carries a fan and sometimes other members. In addition to this, the strap 17 being made of a relatively thin flat strip allows sufficient flexibility to eliminate the danger of tearing the feet 6—6 by the working of the block.

Bearings of the character indicated are often loaded with grease before installation and sometimes require no further lubrication. However, if it be desired to provide for adding lubricant to the bearing we provide means in the form of a lubricant fitting 20, passing through registering apertures 21 in the strap 17 and body of the pillow block. The lubricant fitting 20, as is shown, is screwed or otherwise secured in a hole through the outer bearing ring and a passage through the lubricant fitting communicates with the bearing in the space between the seal plates. Thus, the bearing may be lubricated from the outside without disassembly.

Our improved pillow block, while posessing all of the sound deadening advantages of similar pillow blocks heretofore employed, has the added advantage of increased stiffness which in some instances is important, in that a tipping or rocking of the pillow block about the foot portions 6—6, due to heavy axial thrusts, would be considered a disadvantage.

While the invention has been described in considerable detail and a preferred form illustrated, it is to be understood that various changes may be made within the scope of the invention as defined in the appended claims.

We claim:

1. A pillow block, comprising a block of rubber having foot portions projecting from the body thereof, the body of said block of rubber having a recess therein for receiving an anti-friction bearing, an anti-friction bearing mounted in said recess and comprising inner and outer bearing rings with interposed anti-friction bearing members, seal means for enclosing the space between said bearing rings, a continuous reinforcing member extending through the body of said block and foot portions and substantially spaced from said bearing recess, said reinforcing member having a plurality of openings therein and the rubber of said block extending integrally through said openings in a homogeneous mass, said foot portions and embedded reinforcing member having apertures therethrough, sleeves in said apertures, said sleeves being slightly shorter than the normal thickness of said foot portions, the body of said block and the reinforcing member embedded therein having an aperture extending from the outside to the inside of said bearing recess, and a lubricant fitting passing through said recess and secured to said outer bearing ring, said lubricant fitting having a passage communicating with the interior of said bearing, for the purpose described.

2. In a device of the character described, a block of sound-deadening material having a bearing passage extending therethrough, a bearing comprising inner and outer bearing rings with interposed anti-friction bearing members, the outer ring being seated in said passage, said block having laterally projecting integral feet at the base of said block, upright passages therethrough for fastening means, metallic spacer sleeves fitting in said passages, a relatively thin substantially flat metallic strip, the mid-portion of the same being arched and molded within said block above said bearing passage, the ends of said strip being bent to extend into said feet transversely of the fastener passages therein, each strip end having a spacer sleeve passage, said sleeve extending above and below said strip.

3. In a device of the character described, a block of sound-deadening material having a bearing passage extending therethrough with an annular recess therein, a bearing comprising inner and outer bearing rings with interposed anti-friction bearing members, the outer ring being seated in the recess in said passage, said block having laterally projecting integral feet at the opposite sides of the base of the block, upright passages therethrough for fastening means, metallic spacer sleeves fitting in said passages, a relatively thin substantially flat metallic strip, the mid-portion of the same being arched and molded within said block to extend over said bearing passage and downwardly on opposite sides thereof, the ends of said strip being bent to extend into said feet transversely of the fastener passages therein, each strip having a spacer sleeve passage, said sleeves extending through said passages and above and below the strip end.

RAYMOND R. SEARLES.
JOHN W. SMITH.